Mar. 5, 1929.  C. C. FARMER  1,703,873
PISTON RING TESTING DEVICE
Filed Dec. 15, 1926
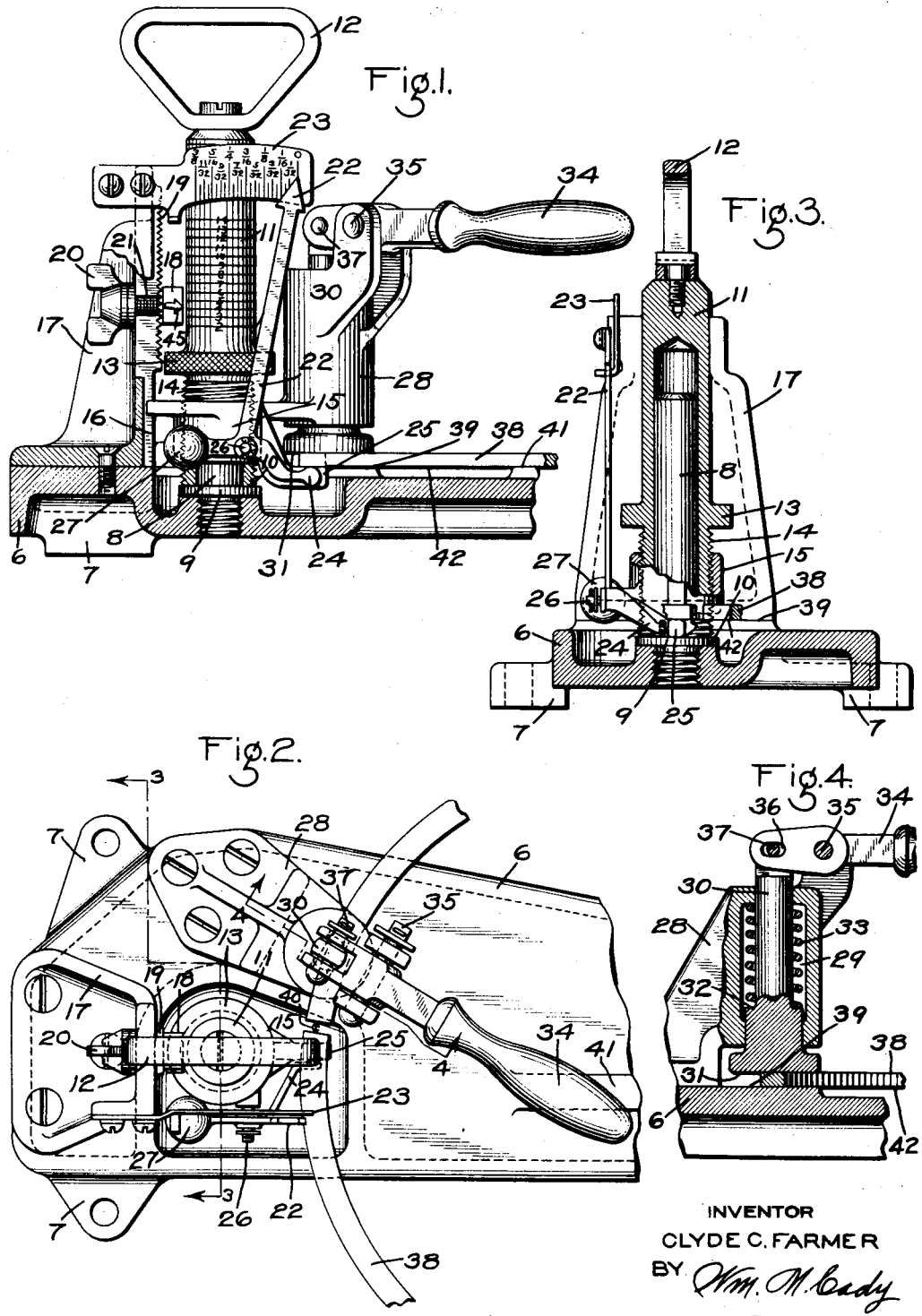
INVENTOR
CLYDE C. FARMER
BY Wm. M. Cady
ATTORNEY Patented Mar. 5, 1929.

1,703,873

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON-RING-TESTING DEVICE.

Application filed December 15, 1926. Serial No. 154,889.

This invention relates to testing devices, and has for its principal object to provide a testing device for indicating the permanent set of a ring, such as a piston packing ring.

It is highly desirable that a piston packing ring have such elasticity that it will expand without taking a permanent set, at least until such wear of the ring and cylinder wall has taken place that the ring should be replaced by a new ring in order to prevent excessive leakage around the ring.

In view of the above, it is therefore important to test piston packing rings so as to indicate whether for a given ring deflection, the ring will take a permanent set.

In the accompanying drawing; Fig. 1 is an elevational view, partly in section, of a ring testing device, embodying my invention; Fig. 2 a plan view thereof; Fig. 3 a section on line 3—3 of Fig. 2; and Fig. 4 a section on the line 4—4 of Fig. 2.

As shown in the drawing, the testing device may comprise a base plate 6 having apertured lugs 7 by which the plate may be secured to a work bench or the like. Having screw-threaded engagement with and vertically mounted on the base plate 6 is a cylindrical guide member 8 provided with a collar 9 adapted to engage a face 10 of the base plate 6.

Mounted for vertical movement on the member 8 is a sleeve like member 11, the cylindrical surface of which is marked with spaced and numbered ring graduations. A hand hold 12 is secured to the upper end of the member 11 for lifting the member 11 vertically on the member 8. The lower end of the member 11 is threaded for screw-threaded engagement with a crosshead 15. Adjacent to the member 11, a standard 17 is secured to the base plate 6 and said standard is provided with a guide section 16 adapted to engage in a recess formed in a projecting flange 5 carried by the crosshead 15, so as to prevent rotative movement of the crosshead. Said crosshead is provided with an arm 25, the outer end of which is adapted to engage the under face of the ring which is to be tested.

Pivotally mounted on a pin 26 carried by the crosshead 15 is a pointer arm 22 having associated therewith a weighted arm 27 and an arm 24, the outer end of the arm 24 being adapted to engage the under face of the ring to be tested.

Carried by the standard 17 is a dial plate 23 which is provided with graduations, preferably representing fractions of an inch.

Mounted on the base plate 6 adjacent to the member 11 is a bracket 28 having a cylindrical portion provided with a vertically disposed bore for receiving a plunger 30. The lower end of the plunger is of enlarged diameter and the lower face 31 thereof is adapted to engage the upper face of the ring to be tested. The cylindrical portion of the bracket 28 is provided with a chamber 29 surrounding the upper portion of the plunger 30 and containing a coil spring 33 adapted to engage a cylinder 32 of the plunger.

The cylindrical portion is provided with lugs, between which is mounted an operating handle 34, pivotally connected to said lugs by a pin 35 and having a forked lever extension provided with elongated slots 36 for receiving a pin 37 carried by the upper end of the plunger 30.

For limiting the lift of the member 11, an adjustable stop 18 is associated with the standard 17. Said stop is carried by a bolt 21 having a clamping thumb nut 20 and the bolt 21 extends through a slot provided in the standard 17. The sides of the slotted portion of the standard 17 are provided with saw teeth 19 adapted to be engaged by similar saw teeth provided on the stop 18, so that when the thumb nut 20 is operated to clamp the stop 18 in position, said stop will be positively held in its adjusted position. The stop 18 may be provided with an arrow mark 45 to indicate proper adjustment of the stop to a desired graduation on the member 11.

The member 11 is provided with a collar 13 adapted to engage the lower face of the stop 18 when the member 11 is raised vertically and said collar has its peripheral face knurled, so that the collar may be employed as a means for rotating the member 11.

In operation, the ring to be tested, such as the ring 38, is placed in position, the handle 34 being depressed to raise the plunger 30, so that the ring may be placed under the face 31 of the plunger. The ring is so disposed that the space 40 between the split ends of the ring is positioned between the arm 25 and the plunger 30 and that portion of the ring underneath the plunger engages a raised face 39 provided on the base plate 6. The base plate is also provided with an outwardly extending raised face 41, on which a portion of the ring, substantially opposite the split portion, engages.

When the ring is in place, the handle 34 is released, so that the spring 33 presses the plunger into engagement with the ring 38 and thus holds the ring while the test is being made. The collar 13 is now rotated, if necessary, to adjust the vertical position of the crosshead 15, so that the upper face of the arm 25 will just engage the lower face of the ring 38. The arm 24 also engages the under face of the ring 38, and if the upper face of the arm 24 is in alinement with the upper face of the arm 25, as is the case when there is no permanent set in the ring 38, the pointer 22 is so positioned with respect to the arm 24 that the pointer will indicate zero on the dial 23.

The stop member 18 is set at a desired ring graduation on the member 11, which determines the distance the member 11 may be moved vertically before the collar 13 engages the stop 18.

The handle 12 is then grasped and lifted up, moving the member 11 until the collar 13 engages the stop 18. The upward movement of the member 11 causes a corresponding movement of the crosshead 15, so that the arm 25 is operated to cause a lateral deflection of the end of the ring 38. The handle 12 is now allowed to return to its original position and crosshead 15 also returns to its original position. If the ring 38 has received no permanent set due to the lateral deflection thereof, then the ring will also return to its original position, in which the arm 24 and the arm 25 both engage the under face of the ring 38, and consequently the pointer 22 will still register with the zero graduation. If, however, the ring has taken a permanent set, while the arm 25 will assume the same original position, whether or not the ring takes a permanent set, the arm 24 will be held in contact with the under face of the ring, due to the action of the weighted arm 27, whereas the arm 25 will not engage the under face of the ring, due to the fact that the ring will be away from the arm 25, by the amount of the permanent set in the ring. The extent of the permanent set is therefore indicated on the dial 23. If, for example, the permanent set in the ring amounts to $\frac{1}{32}$ of an inch, the pointer 22 will register with the graduation on the dial 23 indicating $\frac{1}{32}$ of an inch.

The ring graduations on the member 11 may be so calculated that the graduations may be marked with the ring diameters, say from 2 inch diameter of ring to 14 inches diameter, such that when the stop 18 is set at the graduation marked 7 for example, and the member 11 is pulled up to the stop 18 as set, the ring will be given a deflection which will not cause the ring to take a permanent set, provided the ring has the desired elasticity.

Having now described my invention, what I claim as new and desire to secure by Letters Patent, is:—

1. A device for testing split rings for permanent set produced by deflection comprising means for holding one end of the ring, means for deflecting the other end of the ring by a fixed amount, and means controlled by said last named end for indicating permanent set resulting from deflection.

2. A device for testing split rings for permanent set produced by deflection comprising means for holding one end of the ring, means for deflecting the other end of the ring a predetermined amount, and means for indicating permanent set resulting from said predetermined deflection.

3. A device for testing split rings for permanent set produced by deflection comprising means for holding one end of the ring, means for deflecting the other end of the ring a predetermined amount, and a movable device in constant engagement with said other end of the ring for indicating permanent set produced by deflection of the ring.

4. A device for testing split rings for permanent set produced by deflection comprising means for holding one end of the ring, a member having a portion engaging the other end of the ring and movable to deflect said ring by a fixed amount, and an indicating device having a portion engaging said other end of the ring and adapted to indicate permanent set in the ring.

5. A device for testing split rings for permanent set produced by deflection comprising means for holding one end of the ring, a member having a portion engaging the other end of the ring and movable to deflect said ring by a fixed amount, and an indicating device having a portion engaging said other end of the ring and maintained in contact with the ring by gravity.

6. A device for testing split rings for permanent set produced by deflection comprising means for holding one end of the ring, a longitudinally movable member, an element carried by said member and adjustable to engage one side of the other end of the ring, said member being operated by longitudinal movement of said member to deflect the ring by a fixed amount, and an indicating device carried by said element and having a portion engaging the same side of the other end of the ring and movable by gravity to indicate permanent set in the ring.

7. A device for testing split rings for permanent set produced by deflection comprising means for holding one end of the ring, a longitudinally movable member, an element carried by said member and adjustable to engage one side of the other end of the ring, said member being operated by longitudinal movement of said member to deflect the ring by a fixed amount, a stop for limiting the longitudinal movement of said member, and means engaging said other end of the ring for indicating permanent set in the ring.

8. A device for testing split rings for permanent set produced by deflection comprising means for holding one end of the ring, a longitudinally movable member, an element carried by said member and adjustable to engage one side of the other end of the ring, said member being operated by longitudinal movement of said member to deflect the ring by a fixed amount, an adjustable stop for limiting the longitudinal movement of said member, and means engaging said other end of the ring for indicating permanent set in the ring.

In testimony whereof I have hereunto set my hand.

CLYDE C. FARMER.